Figure 1:
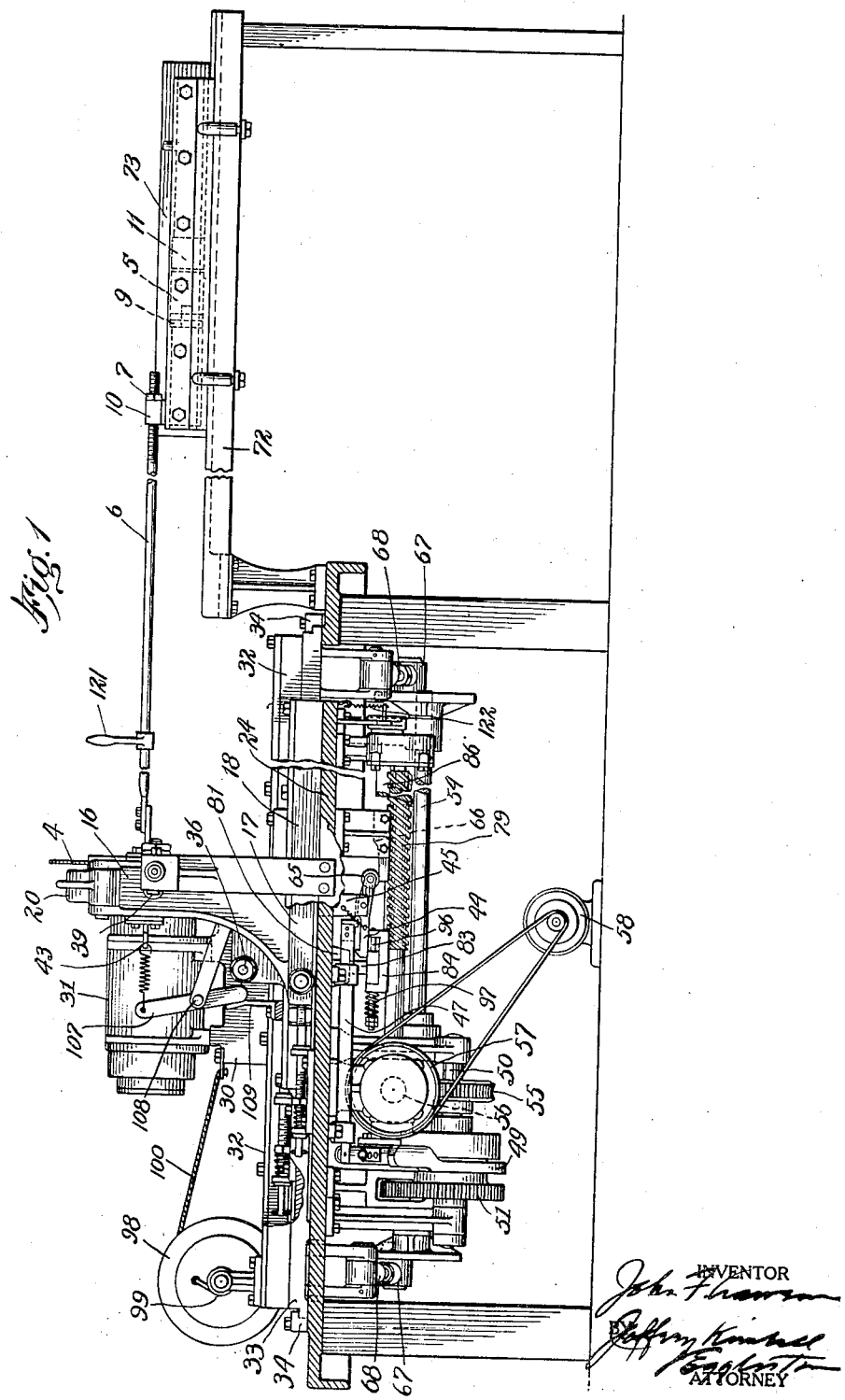

Nov. 21, 1933.  J. F. LAWSON  1,936,331
FLYING SAW
Filed March 11, 1926   4 Sheets-Sheet 1

Nov. 21, 1933.       J. F. LAWSON       1,936,331
                       FLYING SAW
                 Filed March 11, 1926      4 Sheets-Sheet 2

Nov. 21, 1933.   J. F. LAWSON   1,936,331
FLYING SAW
Filed March 11, 1926   4 Sheets-Sheet 3

INVENTOR
John F. Lawson
ATTORNEY

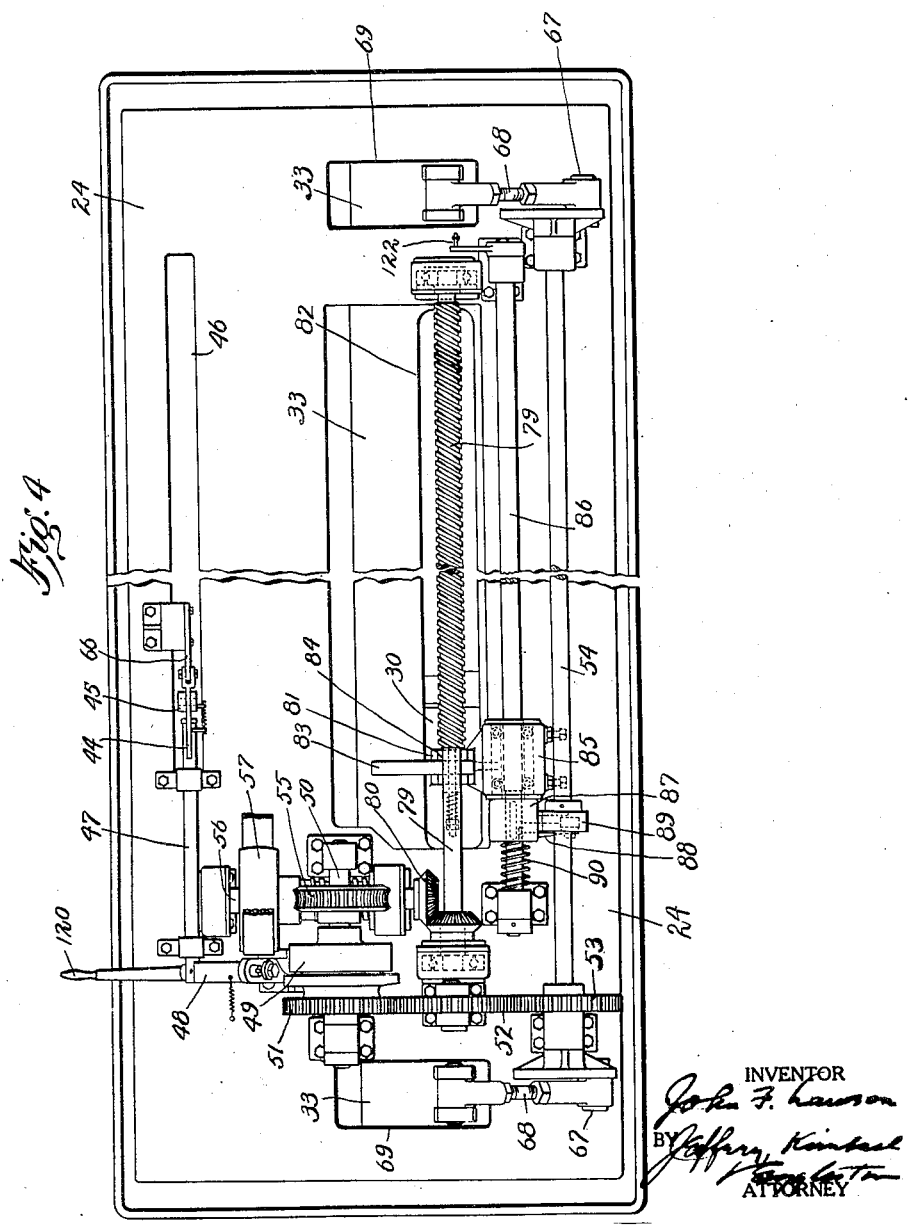

Patented Nov. 21, 1933

1,936,331

UNITED STATES PATENT OFFICE 1,936,331

FLYING SAW

John F. Lawson, Brooklyn, N. Y., assignor, by mesne assignments, to Steel and Tubes, Inc., a corporation of Ohio Application March 11, 1926. Serial No. 93,830

23 Claims. (Cl. 29—69)

The object of my invention is to provide improved mechanism for cutting pipe, bars, etc. It is particularly intended for machines for severing pipes, bars, etc., into desired lengths, but it can also be used where the cuts do not extend completely through the pipe, bar, or other article to be treated. Also, it is adapted for use in various situations as will be apparent from the following description, but being capable of doing its work while the pipe, etc. is in motion, it is peculiarly adapted for continuous operations in immediate cooperation with the machine or plant which manufactures the thing to be severed or otherwise worked on. For example, electric tube welders roll or form a tube from flat metal strip and weld the seam by a continuous progressive operation beginning at one end. Such machines therefore are capable of producing tube of great length, the length depending only on the strip of material or skelp fed to the machine; the tube flows out of the machine uninterruptedly as the welding of the seam progresses. A cutter embodying my invention as hereafter described, put adjacent the welder so as to receive and work on the tube as the latter comes out of the welder, is capable of cutting the outflowing tube into desired lengths without interrupting the flow of tube or the continuity of operation of the welder. As before indicated however, my invention is not limited to continuous operations.

According to my invention, a measuring gage, responsive to the pipe (bar, etc.), is combined with the cutting tool to measure off or determine the length to be severed or the separation between points where non-severing cuts are to be made, and during the actual cutting operation the support of the cutting tool is fixed to the pipe against relative movement lengthwise of the latter so as to avoid complications due to undesired movements of the cutting tool. In its preferred form in machines in which the article is completely severed into pieces, the arrangement is such that the thing to be cut travels lengthwise past the cutting tool until its end strikes a movable member which is the gage, and pushes the gage along. This movement of the gage brings about the locking of the cutting tool or its support to the pipe, bar, etc. and while thus locked (and traveling with the pipe if the pipe is traveling), the cutting tool makes the cut.

Figure 2:
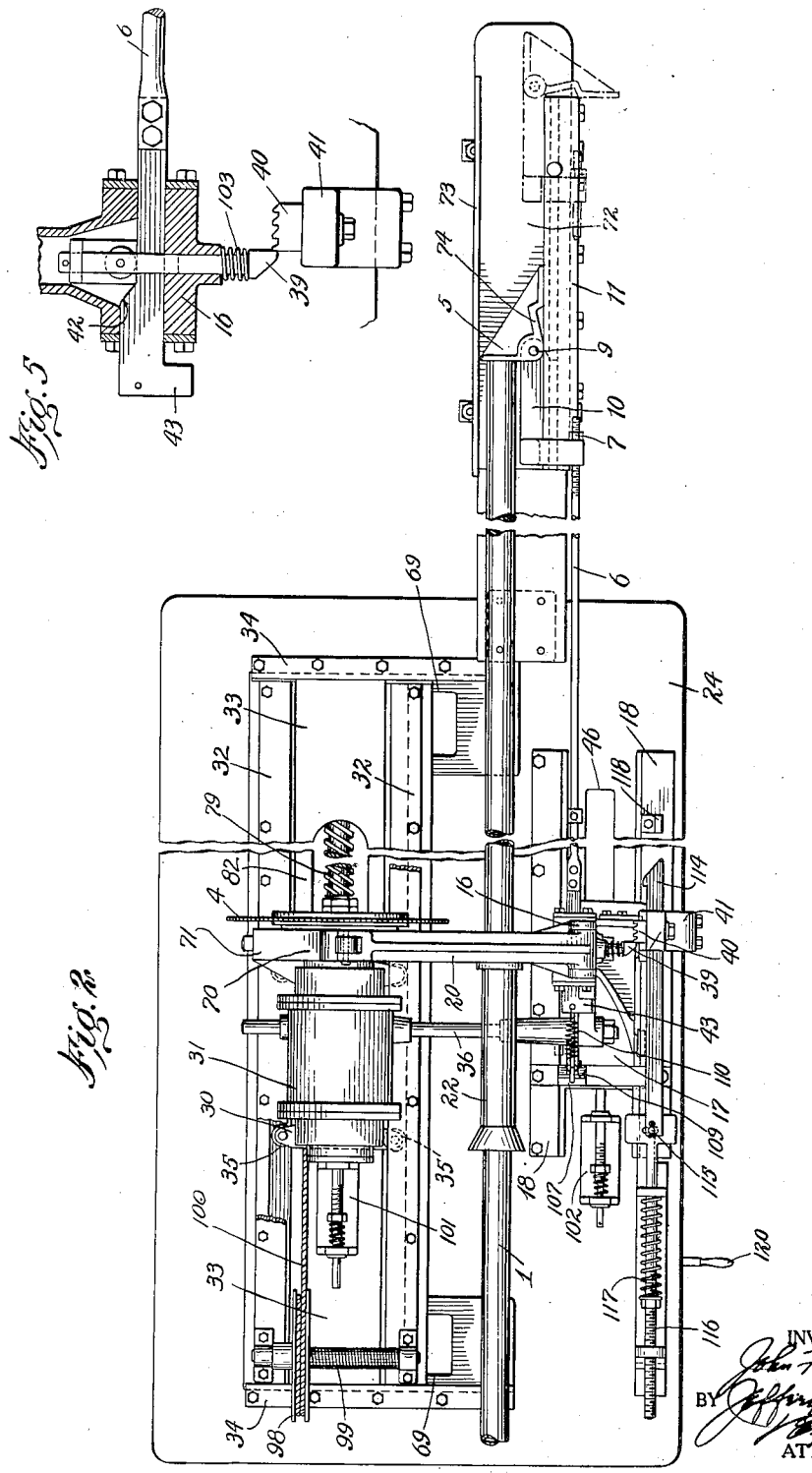
Figure 3:
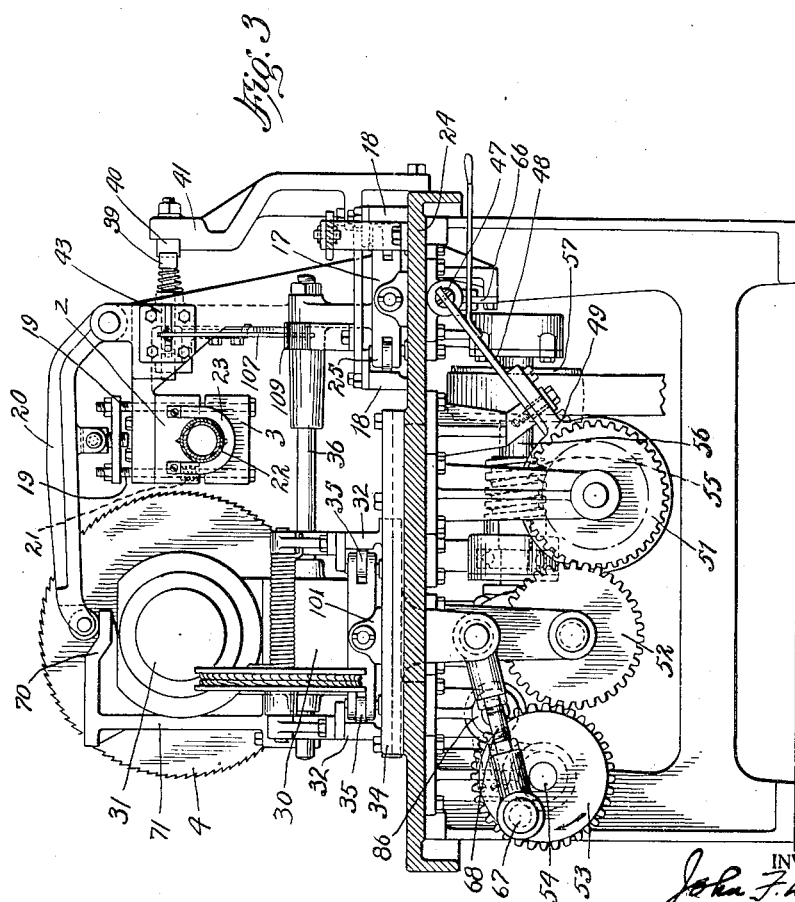

In the accompanying drawings, Figure 1 is a side elevation of a pipe cutter embodying my invention, for cutting pipe into suitable lengths, shown partly in section. Figure 2 is a plan view thereof showing a pipe in the machine, certain parts of the machine being broken away. Figure 3 is an end elevation partly in section. Figure 4 is a view looking upwards underneath the table or frame of the same machine. And Figure 5 is a detail of the carriage latch.

In the drawings, the pipe 1 to be cut is assumed to be moving lengthwise of itself, coming in from the left in Figures 1 and 2. The movement of the pipe may be continuous or intermittent, and its speed uniform or variable. The pipe first passes freely through the open clamp formed by the members 2 and 3 (Fig. 3) and then in front of the cutting tool 4, until the end of the pipe reaches the measuring gage 5. The distance from the cutting tool to the gage determines the length of the piece of pipe cut off, so that by making this distance regulatable (as by threading the gage-end of the gage bar 6 and using a nut 7 to fasten the gage to the bar), pieces of any length within the capacity of the machine can be cut from the pipe 1. The gage 5 is hinged at 9 to a carrier 10 sliding in a guide 11 and coupled to the gage bar 6 by the nut 7, the bar 6 resting in a loop or eye in the carrier 10. One face of the gage, at right angles to the pipe, is arranged to be struck by the pipe end (Fig. 2), but another face, bearing on the guide 11 prevents the gage being turned on its hinge by the thrust of the bar until the gage reaches the end of the guide as shown in dotted lines in Figure 2 and later referred to again. As the pipe moves along therefore, after striking the gage 5, it pushes the gage ahead of it and thereby pulls the gage bar 6 lengthwise for a short distance, and this initiates the further operations.

The clamp member 2 is mounted on a standard 16 rising from a carriage 17 movable lengthwise of the pipe in the guides 18. The lower clamp member 3 is hung on a yoke or bolts 19, usually extending through the member 2, and then are fastened to a lever 20 which, when raised, pulls the member 3 toward member 2 and thus fastens the clamp to the pipe. A spring or springs 21 may be used to open the clamp when released by the lever 20, and I usually employ a pipe guide 22 (shown only in Figs. 2 and 3) to direct the pipe in the clamp, this pipe guide comprising a relatively large bell-mounted pipe attached to the clamp member 2 by a yoke 23. The clamp carriage 17 may be mounted on vertical rollers 24 running on the stationary base frame or table top and horizontal rollers 25 may be used to run against the guides 18, which also are fastened to the table top.

Similarly, the cutting tool 4 (in this instance a circular saw) is mounted on a carriage 30 along with an electric motor 31 to rotate the saw. The guides 32 for this carriage however are mounted on a sub-carriage 33 which is slidable toward and from the pipe in the guides 34, and the latter guides are fixed to the table top 24. The saw therefore is mounted on two carriages movable at an angle to each other whereby the necessary compound movement of the saw is provided for. Horizontal rollers 35 on the saw carriage 30 engage the guides 32 and vertical rollers may also be used to support it on the sub-carriage 33; similar rollers may also be used to direct and support the sub-carriage 33. The saw carriage 30 and clamp carriage 17 are tied together by the bolt 36 and a similar bolt underneath the lever 20 and concealed in the drawings, so that the two carriages move as a unit in their guides 32 and 18; the saw carriage 30 can move along the bolts 36 however in approaching and retreating from the pipe as the sub-carriage 33 moves in its guides 34.

In the initial position of the carriages illustrated in the drawings (i. e., while the pipe is passing through the clamp 2—3 freely), the carriages 17 and 30 are locked in position by means of the latch 39 sliding in the standard 16 and arranged to engage the latch plate 40, which is mounted on an upright 41 fastened to the stationary or table frame 24. The latch 39 is spring-pressed toward the latch plate 40 as illustrated in Fig. 5. A riser or cam 42, however, on the gage bar 6, retracts the latch from the latch plate as the gage 5 and bar 6 are pushed along by the advancing pipe, and after the latch has been released by the gage bar 6, the continued movement of the bar brings its bent-over end 43 against the upright 16 and therethrough may start clamp carriage 17 in motion and therewith the saw carriage 30; the actual starting of the carriages however, after the latch 39 has been released, may be accomplished more or less by the spring bumpers 101 and 102 as later described. As the movement is begun, a hook 44, hung on a projection 45 extending downwardly from the clamp carriage through the slot 46 in the table 24, engages and pulls along with the clamp carriage the clutch bar 47; this acts through the clutch arm 48 to cause the clutch 49 to engage, thereby connecting the constantly turning shaft 50 to the train of gears 51, 52, and 53, and the last of which is keyed to and drives the shaft 54 which operates the sub-carriage 33. The shaft 50 is conveniently driven by gears 55 connecting it to the shaft 56 which has a pulley 57 keyed thereto and belted to an electric motor 58. This clutch 49 is of the type which, by itself, maintains its engaged position for one revolution and then automatically releases. The hook 44 therefore can be withdrawn from the clutch bar 47 as soon as the clutch has been engaged, thus permitting the carriages to continue their movement along with the pipe, unimpeded by the clutch bar 47, the movement of which is limited. For this purpose, the tail of the hook 44 (usually provided with a roller 65) rides up a fixed cam 66 attached to the table 24 shortly after the clutch is engaged, so that the clutch end of the hook is depressed and withdrawn from the clutch bar.

The sub-carriage shaft 54 thus being put into operation by the clutch 49, acts through the cranks 67 and connecting rods 68, extending to the sub-carriage 33 through the slots 69 in the table 24, to slide the sub-carriage in its guides 34 toward the pipe. In the first part of this movement, a cam 70 on an upright 71 mounted on the saw carriage 30, passes underneath and raises the adjacent end of the lever 20, thus closing the clamp 2—3 on the pipe 1 back (in the drawings, to the left) of the point where the saw will make the cut as will be apparent from the drawings.

The clamp now ties the clamp carriage and saw carriage to the advancing pipe (a horizontal continuation of cam or riser 71 holding the clamp closed as the sub-carriage moves further toward the pipe) and the pipe now acts through this clamp to continue the movement of these carriages along with the pipe (to the right in the drawings). The gage 5 has now served all its functions. The guide 11 therefore can be so arranged that the gage 5 reaches the end of this guide or wall shortly after the clamp 2—3 fastens to the pipe, and thus is permitted to turn on its hinge so that the pipe is held by the clamp 2—3 alone and is free to pass the gage. A stop halts the gage-carrier 10 as the gage turns on its hinge to prevent the carrier running off the guide and the gage bar 6 thereafter, as the pipe continues its movement, slides through the eye of the gage carrier 10 in which it rests. The raised portion 72 of the table or frame carries the gage carriage 10 and guide 11 and also forms a rest or slideway for the pipe between the guide wall 11 and the opposite flange or wall 73. Commonly I make the wall of the gage 5 bearing on the guide 11 of considerable length parallel with the pipe, and provide it with a notch 74 rather remote from hinge 9, which, reaching the end of the guide 11, permits the gage 5 to snap away from the end of the pipe as soon as the clamp 2—3 is firmly fixed to the pipe while providing the gage with adequate support on its hinge 9 so long as it is under the thrust of the pipe end; a slightly further movement permits the gage to turn completely out of the path of the pipe as indicated in broken lines in Fig. 2.

While these actions have been going on and while the pipe, acting through the clamp 2—3, may continue to move the clamp and saw carriages to the right, the sub-carriage shaft 54 continues turning, and its rate of movement is such that at the greatest pipe speed anticipated, it pulls the rotating saw completely through the pipe and furthermore carries the return movement of the sub-carriage 33 so far as to completely withdraw the saw from the path of the pipe, before the clamp and saw carriages reach their outermost or extreme right-hand positions. As they approach these right hand positions therefore, i. e., when the saw has been retracted from the path of the pipe, the clamp 2—3 may be released as the cam or riser 70 passes from underneath the lever 20, and the return of the saw and clamping carriages to their initial left-hand positions is then begun.

The return of the carriages to the left is brought about by the threaded shaft 79. This is borne by and underneath the stationary table or frame 24 substantially immediately below the cutting-tool carriage 30, and is geared to the constantly turning shaft 56 as indicated at 80. A yoke 81 extends downwards from the cutting tool carriage 30 (through the slot 82 in the sub-carriage) and straddles an arm 83 carrying a block 84 which is threaded on its lower face to mesh with the threads of the shaft 79. The arm 83 is carried by a box 85 sliding on the square bar 86 which is mounted in journal bearings on the under surface of table 24, and which is normally held by the spring 90 in such a position that the threaded block 84 is held out of engagement with the threaded shaft 79. As the carriage is propelled to the right therefore by the pipe 1 as before described, the yoke 81 which engages with the arm 83 slides this arm and the threaded block to the right along their supporting square bar 86; obviously the threaded block arm 83 must be long enough to engage with the yoke 81 in all positions of the sub-carriage 33. To rock the square bar 86 against the pull of its spring 90 to bring the threaded block 84 into mesh with the threaded shaft 79, there is keyed to the square bar 86 a box 87 having an arm 88 in position to be struck by a cam 89 on the sub-carriage shaft 54; at the proper time to start the carriages toward the left, this cam 89 raises the arm 88 and this rocks the square bar 86 so as to depress the block 84 onto the shaft 79. From now on and while the sub-carriage shaft 54 continues to turn, the cam 89 holds the square bar 86 in this position with the threaded block 84 meshed with shaft 79 until the shaft 79 has returned the carriages to their initial positions, which they reach at just about the time that the sub-carriage shaft 54 completes its single revolution, brings the sub-carriage 33 to its rearmost position, or fartherest away from the pipe 1, and stops by the opening of the clutch 49. It is obvious that the shaft 79 may be arranged to move the carriages to the left somewhat faster than the pipe moves them to the right. To assure the release of the two carriages from the threaded shaft 79 at the proper moment, I usually mount the cam-arm box 87 sufficiently loosely on the square bar 86 to slide along the same and so relate it to the box 85, that the latter strikes the cam-arm box 87 just as the carriages reach their extreme left-hand position, thus pushing the cam-arm box 87 (against the spring 90, one end of which is connected to this box) to the left sufficiently to push the arm 88 off the cam 89. This permits the spring 90 to turn the square bar 86 back to its initial position and lift the threaded box 84 off the shaft 79 at the proper moment. The same spring 90 pushes the box 87 to the right again at the beginning of the next cycle, so that the cam arm 88 is returned to the path of the cam 89 in good time. To further assure stopping the saw and clamp carriages at the end of their leftward movement, I also usually terminate the threads on the shaft 79 at such a point that the threaded block 84 runs completely off them in moving to the left, as shown in Fig. 4.

To reduce the shock as the threaded block 84 takes up the work of moving the carriages to the left, I usually mount the arm 83 in a recess in the block 84 as shown in Fig. 1 so that the block can move a short distance on the spindle 96, parallel to the shaft 79 and independently of the arm 83, and provide a spring 97 so that the threaded shaft 79 first moves the block 84 against the tension of this spring 97 and thereby brings the load onto the arm 83 fairly gradually. To the same end, and if desirable to actually start the carriages to the left, I employ a pulley 98, spring 99 and cable 100 tied to the pulley and the cutting tool carriage 30. The pulley and spring support are mounted on the sub-carriage 33. When the saw and clamp carriages are in their initial or left-hand positions shown in the drawings, the spring 99 is under little if any tension. As the carriages are moved to the right, however, this spring is tensioned and hence when the clamp 2—3 is released, the spring and pulley give the carriages a certain bias to the left or even start them to the left prior to the assumption of the load by the shaft 79. Similarly to bias the carriages to the right when in their initial positions and relieve the gage 5 of labor, I employ the spring bumpers 101 and 102 previously mentioned. Bumper 101 is mounted on the sub-carriage 33 and engages the carriage 30, and bumper 102 is mounted on table 24 and engages carriage 17. Each comprises a sliding rod to be struck by the respective carriage and a spring urging the rod to the right (in the drawings). At the end of their leftward movement, the carriages compress the springs. The latter are then held under tension by the re-engagement of the latch 39 with the latch plate 40, and on the release of this latch are ready to start, or assist in starting, the carriages to the right.

The return of the clamp carriage 17 to the left replaces the latch 39 opposite the latch plate 40 of course, and the spring 103 of the latch throws the latch outwardly into position for engagement with the latch plate 40 as soon as the rise or cam surface 42 passes from underneath the roller on the tail of the sliding latch. A lever 107 hinged at 108 to the clamp carriage 17, pulls the gage bar 6 to the left at the proper time to remove the rise or cam 42 from underneath the roller on the latch 39; one end of this lever is connected to the left-hand end of the gage bar as shown in Fig. 1, while the opposite end of the lever is arranged to strike a stationary stop 109, mounted on the table 24, near the end of the leftward movement of the two carriages, so that the gage bar 6 is forcibly drawn to the left through its eye in the standard 16 at this time. By connecting the lever 107 to the gage bar 6 by a spring, such as 110, the gage bar 6 can be moved to the right initially by the pipe, unimpeded by the lever 107, which continues to rest against the stop 109 until after the latch 39 leaves the latch plate 40. The retreat of the carriages and gage bar 6 to the left returns the gage 5 to its initial position shown in drawings in an obvious manner.

The cycle of operations is now completed and all parts of the machine are now in their initial or starting positions ready to cut off another length of pipe as soon as the new end of the oncoming pipe reaches the gage.

To the mechanism as thus described, I sometimes add a brake or other device to retard the carriage 17 near the beginning of its movement following the unlatching of 39 from 40. Such a mechanism is illustrated at 114. Occasionally, and especially when the pipe is travelling at a rather high rate of speed, the initial starting of the carriage 17 following the release of the latch 39 is followed by a bump or second start caused by the bent over end 43 of the gage bar striking the standard 16; this causes the carriages to travel faster than the gage for a short distance about the time that the clamp takes hold of the tube. This in turn may cause a variation in the length of pipe cut. By using a brake or other mechanism to retard the movement of the carriage 17 until the carriage has begun to move along with the gage bar at a fixed rate, this action is prevented. After the carriage 17 has begun to move uniformly with the gage bar, it may be released from the brake.

In the drawings, the part 114 is a sliding latch member extending generally parallel to the path of the carriage 17 and having its hook end located to engage the standard 16, or an extension therefrom, at or shortly after the carriage begins to move in the direction of the movement of the pipe. At its opposite end, this sliding latch is pinned at 115 to the slide 116 which is pressed to the left in the figure by the spring 117. Usually I use an adjustable tensioning device as illustrated. The pin 115 in the sliding latch rides in a slot in the slide 116 as appears in Fig. 2, the slide extending substantially at right angles to the path of the carriage. It will be apparent therefore that as the carriage 17 starts its movement it is soon caught by the latch bar 114, whereupon the spring 117 resisting the movement of the latch bar 114, affords a restraint on the forward movement on the carriage 17 until (the time for its variable action having passed) the inclined forward end of the latch bar 114 is brought against the stop 118 which crowds the latch bar 114 out of engagement with the carriage; the slot for the pin 115 permits this action, thereby permitting the latch 114 to turn slightly in its guide substantially underneath the standard 41. On the return movement of the carriage 17 of course, it again passes behind the hook of this latch bar.

It will be observed that the latch plate 40 as illustrated, is provided with a number of notches, any one of which is adapted to receive the latch 39. While the carriages may at times, or usually, be returned to their extreme left-hand position wherein the latch 39 engages behind or in the last notch of the latch plate 40, the leftward movement of the carriages may be interfered with by bends in the pipe 1 or otherwise, so as not to reach this extreme position. I have therefore provided the plurality of notches indicated in the latch plate 40. Partly for the same reason (Fig. 1), a slight spacing is provided for between the hook 44 and the clutch bar 47, so that the carriages are permitted to move a short distance before the clutch bar is picked up and the clutch engaged. This spacing is such of course that the hook 44 stands back of the engaging end of the clutch bar 47 regardless of whether the latch 39 is located in the first or the last of the notches in the latch plate 40.

There are also operating reasons why it is somewhat better to let the carriages get started in motion in the direction of the pipe movement before the clutch is released. Customarily, I attach a handle 120 to the clutch arm 48, whereby the clutch can be engaged by hand. By this means, the saw carriage can be brought into action and a cut made even though the pipe is not in movement at all. Also, customarily, I put a handle 121 on the gage bar 6, whereby this gage bar can be pulled along by hand and the machine brought into action without the pipe engaging with the gage 5. An arrangement whereby the machine can thus be brought into action by hand, is important in machines of this character, inasmuch as it is frequently necessary to cut out a piece of poor material for example, which is not necessarily of the length for which the machine is set to operate automatically.

I might also add that I may use a spring or springs such as 122 to turn the square bar 86, thus relieving the spring 90 of this function, or to assist the spring 90 with the construction as illustrated.

It will now be apparent that my invention is suited for cutting articles other than pipe. Also it will be understood that the drawings illustrate only the preferred form of my invention and for various situations appropriate changes can be made. In short, my invention is not limited to the details of construction illustrated in the drawings and described above except as appears in the following claims.

And in these claims, for lack of a more comprehensive word, I use the word "bar" in a comprehensive sense to include any article, solid or hollow, to the cutting of which, as appears from the foregoing, my invention is applicable.

I claim:

1. In a machine for cutting a moving bar, a cutting tool, means to move said tool with the bar comprising a clamp for the bar, connected to the tool, means for operating the clamp, means acting on the cutting tool prior to the beginning of a cutting operation tending to move the cutting tool in the same direction as the bar, a latch holding the cutting tool against movement by the last mentioned means, and a gage to release said latch.

2. In a machine for cutting a moving bar, a cutting tool, a clamp for the bar attached to said cutting tool to cause said cutting tool to move with the bar, means for operating the clamp, a locking device to hold said cutting tool against movement by the bar, and a measuring gage to release said locking device.

3. In a machine for cutting a moving bar, a cutting tool, means to move said cutting tool with and at the same speed as the bar, a gage member movable bodily in the direction of movement of the bar and arranged to be engaged and moved by the end of the bar, a connection connecting the gage member to said means through which movement of the gage member brings said means into action, and means releasably holding said gage member in the path of the bar, said means releasing said gage member after the first mentioned means has been brought into action.

4. In a machine for cutting a moving bar, a cutting tool, a gage member for engagement by the end of the bar to bring the hereinafter mentioned means into action, means, additional to said gage member, to cause said tool to move with and at the same speed as the bar lengthwise of the latter, a carrier for said gage member movable lengthwise of the bar, said gage member being mounted on said carrier for movement thereon, into and out of the path of the bar, and a support for the gage member to support the same on its carrier in the path of the bar for a part, and only a part, of the distance said means causes the tool to move with the bar.

5. In a machine for cutting a moving bar, a cutting tool, a gage member, a sliding carriage to which said member is hinged, said member being engageable by the bar to be pushed along by the bar to control the action of the cutting tool, and a guide for the gage member, said gage member having a face extending substantially cross-wise of the path of the bar and another face engaging with said guide to support the gage member on its hinge under the thrust of the bar.

6. The combination of claim 5 characterized by the fact that there is also mechanism for causing the cutting tool to move with the bar, and the movement of the gage member brings the said mechanism into action; and further, that said guide is so short that the gage member reaches the end thereof and turns on its hinge shortly after said mechanism is brought into action and thereby permits the bar to pass said gage member.

7. The combination of claim 5 characterized by the fact that the face of the gage member engaging the guide has an indentation which, on reaching the end of the guide, releases the bar from the gage member.

8. In a machine for cutting a moving bar, a cutting tool, a support therefor, a power-driven member, a shaft connected to said support to move the same toward the bar to be cut and return the same to a position remote from the bar, a clutch means to connect said shaft to said power driven member, a gauge to actuate said clutch to cause said support to be moved toward the bar, a power driven device to move said cutting tool in a direction opposite the direction of movement of the bar, and a cam on said shaft to cause said power driven device to so move the cutting tool after the cut has been completed.

9. In a machine for cutting a moving bar, a cutting tool, a support therefor movable toward the bar to be cut and also movable along with the bar, a power driven member, a shaft for moving said support toward and from said bar, a clutch for connecting said power driven member and said shaft, a gage to actuate the clutch, means for moving said support along with the bar, a threaded shaft, a rock shaft, a threaded block fixed to said rock shaft against rotation on the latter but movable along the rock shaft with said support, out of engagement with the threaded shaft, as said support moves along with the bar, means connecting said support and threaded block for movement one by the other, and a cam on the first-mentioned shaft to rock said rock shaft on the completion of a cut to mesh said threaded block with said threaded shaft for the return of the block, and therewith said support, to its initial position.

10. In a machine for cutting a moving bar, a cutting tool, a support therefor movable toward the bar to be cut and also movable along with the bar, a power driven member, a shaft for moving said support toward and from said bar, a clutch for connecting said power driven member and said shaft, a gage to actuate the clutch, means for moving said support along with the bar, a threaded shaft, a rock shaft, a threaded block fixed to said rock shaft against rotation on the latter but movable along the rock shaft with said support, out of engagement with the threaded shaft, as said support moves along with the bar, means connecting said support and threaded block for movement one by the other, a rocker fixed to said rock shaft against rotation thereon but slidable therealong, and a cam on the first-mentioned shaft engageable with said rocker to rock the rock shaft on the completion of a cut to mesh the threaded block with the threaded shaft for the return of said block and therewith said support to their initial positions, said slidable rocker being in the end of the path of the threaded block on its return movement so that said block, near the end of its movement, slides the rocker out of the path of its cooperating cam.

11. The subject matter of claim 9, characterized by the fact that said means connecting said support and threaded block for movement one by the other, includes a spring-connection to take up shock on the meshing of the threaded block with the threaded shaft.

12. The subject matter of claim 9, in combination with a spring tending to return the tool support in the direction opposite the direction of movement of the bar.

13. In a machine for cutting a moving bar, a cutting tool movable with the bar to be cut, power means to return the tool in the opposite direction, and spring means connected to the tool and to a part of the machine which is fixed against movement in the direction of movement of the bar, in which energy is stored during the movement of the tool with the bar, to initiate the return movement.

14. In a machine for cutting a moving bar, a cutting tool, a clamp to fasten the cutting tool to the bar for movement therewith, a gage member arranged to be moved by the end of the bar to cause the clamp to grip the bar, said gage member being movable by the thrust of the bar out of the path of the latter, and a support against which said gage member rides as it is moved by the bar to hold the gage member in the path of the bar, said support being so short that the gage member passes beyond the support before the cut is completed and thereby is allowed to move out of the path of the end of the bar.

15. In a machine for cutting a moving bar, a cutting tool movable lengthwise of the bar to be cut, tensioned means to move the cutting tool in the same direction as the bar moves, said means being tensioned, and tending to so move the cutting tool, prior to the beginning of each cutting operation, a measuring gage positioned to be engaged and moved by said bar and connected to said tool to move the latter lengthwise of the bar, and means additional to said tensioned means to move the cutting tool with and at the same speed as the bar after the movement of the cutting tool has been started by the gage.

16. In a machine for cutting a moving bar, a cutting tool, means for intermittently moving the cutting tool with the bar, continuously moving means to return the tool in the opposite direction to the position from which it starts to move with the bar, a clutch to couple the cutting tool to said means, and resilient means to take up shock on the coupling of the cutting tool to the continuously moving means.

17. The subject matter of claim 16, characterized by the fact that said resilient means are included in the connection between the clutch and cutting tool to take up shock.

18. In a cutting machine of the kind indicated, a cutting tool, means to move the tool with the work, a driven member to return the tool to the position from which said means moves the tool, and means to fasten the tool to the driven member for returning the tool, said means being yieldable substantially in the direction of the return movement to soften the shock of starting the tool in return.

19. In a machine for cutting a moving bar, a base frame, a first carriage mounted thereon, a crank mounted on said base frame and connected to said first carriage for moving the latter toward and from the bar to be cut, power means providing, independently of the bar, the energy to turn said crank, a second carriage mounted on said first carriage, a cutting tool mounted on said second carriage, a clamp for the bar connected to said second carriage to move said carriage with the bar and lengthwise of the latter, a gage to set said crank and clamp in action, and means to return said second carriage in the direction opposite the direction of movement of the bar after a cut has been made.

20. The subject matter of claim 19, characterized by the fact that means are provided on said second carriage for closing said clamp on the bar, said means operating to close the clamp on the movement of said carriages toward the bar.

21. In a machine for cutting a moving bar, a base frame, a first carriage mounted thereon, a crank mounted on said base frame and connected to said first carriage for moving the latter toward and from the bar to be cut, a second carriage mounted on said first carriage, a cutting tool mounted on said carriage, a clamp for the bar connected to said second carriage to move said carriage with the bar and lengthwise of the latter, means on said second carriage acting to close said clamp on the bar as said carriages move toward the bar, driving means, a clutch to connect said crank to said driving means, a gage to close said clutch and means driven by said driving means to return said second carriage in the direction opposite the direction of movement of the bar after the cut has been made.

22. The subject matter of claim 21, characterized by the fact that said gage stands in the path of the end of the bar to be cut and is connected to said second carriage to move the latter under the thrust of the bar.

23. The subject matter of claim 21, characterized by the fact that said means to return the second carriage includes a threaded shaft, a threaded block for engagement with the latter, and means controlling the placement of said block in mesh with the threaded shaft after the completion of a cut.

JOHN F. LAWSON.